(12) United States Patent
Dingler et al.

(10) Patent No.: US 11,047,143 B2
(45) Date of Patent: Jun. 29, 2021

(54) SEAL FOR A LEAD-THROUGH FOR A TIE ROD THROUGH A PANEL FORMWORK ELEMENT

(71) Applicant: MEVA Schalungs-Systeme GmbH, Haiterbach (DE)

(72) Inventors: Gerhard Dingler, Haiterbach (DE); Uwe Schramm, Horb-Muhringen (DE); Rick Schille, Ebhausen (DE)

(73) Assignee: MEVA Schalungs-Systeme GmbH, Haiterbach (DE)

( * ) Notice: Subject to any disclaimer, the term of this patent is extended or adjusted under 35 U.S.C. 154(b) by 0 days.

(21) Appl. No.: 16/477,517

(22) PCT Filed: Jan. 27, 2017

(86) PCT No.: PCT/DE2017/100056
§ 371 (c)(1),
(2) Date: Jul. 11, 2019

(87) PCT Pub. No.: WO2018/137728
PCT Pub. Date: Aug. 2, 2018

(65) Prior Publication Data
US 2020/0123793 A1    Apr. 23, 2020

(51) Int. Cl.
*E04G 17/065* (2006.01)
*E04G 17/075* (2006.01)
(Continued)

(52) U.S. Cl.
CPC ..... *E04G 17/0652* (2013.01); *E04G 17/0644* (2013.01); *E04G 17/0655* (2013.01);
(Continued)

(58) Field of Classification Search
CPC ...... F16J 15/104; F16J 15/106; F16B 33/004; E04G 17/0658; E04G 17/0758;
(Continued)

(56) References Cited

U.S. PATENT DOCUMENTS 929,470 A * 7/1909 Neil .................. E04G 11/28
249/20
1,667,253 A * 4/1928 Hawley, Jr. ......... E04G 17/0658
264/33
(Continued)

FOREIGN PATENT DOCUMENTS

CH        450687 A  * 1/1968  ......... E04G 17/0752
CH        715401 A2 * 3/2020  ........... E04B 1/8209
(Continued)

OTHER PUBLICATIONS

Translation of DE 2408558; Aug. 28, 1975 (Year: 1975).*
(Continued)

*Primary Examiner* — Michael Safavi
(74) *Attorney, Agent, or Firm* — Renner, Otto, Boisselle & Sklar, LLP

(57) ABSTRACT

A seal for a lead-through for a tie rod through a panel formwork element. The seal includes a sleeve, a sealing element and a sliding tube, which are disposed on the tie rod and, together with the tie rod, are placed through the panel formwork element from a rear side, so that the sealing element exits the panel formwork element on a front side and, after brief pulling back of the tie rod, provides sealing between the sleeve and the panel formwork element, for one-sided anchoring.

5 Claims, 1 Drawing Sheet

(51) Int. Cl.
*E04G 17/06* (2006.01)
*F16J 15/10* (2006.01)
*F16L 5/10* (2006.01)

(52) U.S. Cl.
CPC ........ *E04G 17/0752* (2013.01); *F16J 15/104* (2013.01); *F16L 5/10* (2013.01)

(58) Field of Classification Search
CPC ............ E04G 17/0755; E04G 17/0754; E04G 17/0654; E04G 17/0655; E04G 17/0652; E04G 17/0742; E04G 17/0752; E04G 17/0714; E04G 17/075; E04G 17/0751; E04G 17/0757; E04G 17/0707; E04G 17/0721; E04G 17/0728; E04G 17/0735; E04G 17/07; E04G 17/0657; E04G 17/0651; E04G 17/065; B29C 2045/14606; B29C 2045/14934; B29C 45/2608; B28B 7/0011; B28B 2007/0047; F16L 41/001; F16L 41/002; F16L 41/10; F16L 41/088; F16L 5/04; F16L 5/10; F16L 5/025; F16L 5/02
USPC .................. 249/43; 277/585, FOR. 208
See application file for complete search history.

(56) References Cited

U.S. PATENT DOCUMENTS

| | | | | | |
|---|---|---|---|---|---|
| 1,767,834 | A | * | 6/1930 | Carlson | E04G 17/0752 249/217 |
| 2,157,107 | A | * | 5/1939 | Bay | F28F 19/002 285/213 |
| 2,314,866 | A | * | 3/1943 | Bosco | E04G 17/0652 249/43 |
| 2,632,582 | A | * | 3/1953 | Blevins, Jr. | B65D 88/54 220/86.1 |
| 3,411,816 | A | * | 11/1968 | Andrews | F16B 33/004 52/718.02 |
| 3,437,306 | A | * | 4/1969 | Gates | E04G 17/0754 249/43 |
| 3,464,667 | A | * | 9/1969 | Sledz | E04G 9/10 249/190 |
| 3,490,730 | A | * | 1/1970 | Gates, Jr. | E04G 17/0754 249/43 |
| 3,618,444 | A | * | 11/1971 | Kay et al. | F16B 33/004 411/373 |
| 3,822,860 | A | * | 7/1974 | Lovisa | E04G 17/0714 249/217 |
| 3,927,857 | A | * | 12/1975 | Lovisa | E04G 17/0735 249/217 |
| 3,933,332 | A | * | 1/1976 | Lovisa | E04G 17/0652 249/42 |
| 4,159,097 | A | * | 6/1979 | Strickland | E04G 17/0652 249/190 |
| 4,159,099 | A | * | 6/1979 | Maguire | E04G 15/061 249/177 |
| 4,445,838 | A | * | 5/1984 | Groff | A21C 3/08 264/103 |
| 4,625,940 | A | * | 12/1986 | Barton | F16L 5/08 249/157 |
| 5,537,797 | A | * | 7/1996 | Harkenrider | E04G 11/10 52/745.13 |
| 5,761,874 | A | * | 6/1998 | Hayakawa | E04G 17/06 249/40 |
| 6,296,224 | B1 | * | 10/2001 | Hayakawa | E04G 9/05 249/47 |
| 8,981,228 | B2 | * | 3/2015 | Okuhara | F16L 5/10 174/152 G |
| 9,574,692 | B2 | * | 2/2017 | Magno, Jr. | F16J 15/56 |
| 10,473,253 | B2 | * | 11/2019 | Vrame | H02G 3/0406 |
| 2002/0038492 | A1 | * | 4/2002 | Hashimoto | F16L 5/10 16/2.1 |
| 2003/0230860 | A1 | * | 12/2003 | Mirales | F16L 5/10 277/630 |
| 2005/0218291 | A1 | * | 10/2005 | Musk | E04G 17/047 249/43 |
| 2018/0126929 | A1 | * | 5/2018 | Miller | F16L 5/10 |

FOREIGN PATENT DOCUMENTS

| | | | | |
|---|---|---|---|---|
| CN | 201078097 Y | * | 6/2008 | ............. E04G 17/00 |
| DE | 18 77 701 U | | 8/1963 | |
| DE | 1534955 A1 | * | 7/1969 | ........ E04G 17/0657 |
| DE | 1534985 A1 | * | 7/1969 | ........ E04G 17/0658 |
| DE | 1684261 A1 | * | 3/1971 | ........ E04G 17/0658 |
| DE | 2005210 A1 | * | 9/1971 | ........ E04G 17/0721 |
| DE | 2408558 A1 | * | 8/1975 | ........ E04G 17/0658 |
| DE | 2422224 A1 | * | 11/1975 | ........... E04G 17/065 |
| DE | 2438299 A1 | * | 2/1976 | ........ E04G 17/0658 |
| DE | 2930833 | * | 2/1981 | ................ F16B 9/026 |
| DE | 3929849 A1 | * | 3/1991 | ........ E04G 17/0652 |
| DE | 102 45 187 A1 | | 4/2004 | |
| DE | 202010005185 U1 | * | 8/2011 | ........ E04G 17/0758 |
| DE | 102018215430 A1 | * | 3/2020 | ........ E04G 17/0652 |
| EP | 0128626 A2 | * | 12/1984 | ............. E04G 17/06 |
| EP | 0784134 A1 | * | 7/1997 | ........... E04G 17/065 |
| EP | 1564078 A2 | * | 8/2005 | ................ F16L 5/10 |
| EP | 2886745 A1 | * | 6/2015 | ........ E04G 17/0658 |
| JP | 06253808 A | * | 9/1994 | ........... A24C 5/3418 |
| JP | 2011217552 A | * | 10/2011 | ........ B60R 16/0222 |
| WO | WO-2004029383 A1 | * | 4/2004 | ........ E04G 17/0658 |
| WO | WO-2012020519 A1 | * | 2/2012 | ........ E04G 17/0658 |
| WO | WO-2020058189 A1 | * | 3/2020 | ........ E04G 17/0644 |

OTHER PUBLICATIONS

Translation of CH 450,687. (Year: 1968).*
International Search Report for corresponding Application No. PCT/DE2017/100056, dated Jun. 19, 2017.

* cited by examiner

SEAL FOR A LEAD-THROUGH FOR A TIE ROD THROUGH A PANEL FORMWORK ELEMENT

TECHNICAL FIELD

The invention relates to a seal and method for a lead-through for a tie rod through a panel formwork element in a concrete formwork. The seal is intended for a one-sided anchoring of double-sided formworks.

BACKGROUND

Double-sided formworks are wall formworks for which the panel formwork elements are set up at a distance opposite one another. Front sides of the panel formwork elements face one another. The front sides of the panel formwork elements are the sides that come in contact with the concrete. They comprise a board made of wood or plastic material, referred to as a formwork shell, which is attached to a metal frame that reinforces the formwork shell. The frame of a panel formwork element is attached to a rear side of the formwork shell facing away from the concrete. Concrete is poured in a flowable state into an intermediate space between the panel formwork elements set up at a distance opposite one another to produce a wall. So as to resist the pressure of the flowable concrete, the opposing panel formwork elements are held together by tie rods, which extend through tie holes of the panel formwork elements at tie points. The tie rods bridge the distance between the opposing panel formwork elements and are secured, for example by way of screwed-on nuts, on rear sides of the panel formwork elements which face away from one another. A tension-resistant connection that prevents the opposing panel formwork elements from moving apart suffices.

One-sided anchoring shall be understood to mean that the anchoring, which is to say the connection of the opposing panel formwork elements by way of tie rods, is carried out from the rear side of one of the two panel formwork elements. The opposing panel formwork element does not need to be accessible. The tie rods are placed through the tie holes in the formwork shells of the opposing panel formwork elements. The frames of the panel formwork elements either likewise include tie holes, which are congruent with the tie holes in the formwork shells, or the tie holes in the formwork shells are located next to struts of the frames, and the tie rods are guided past the struts. For securing to an opposing panel formwork element, which does not need to be accessible, for example, the tie rods, which include at least one thread, are screwed into internal threads of the opposing panel formwork elements. A nut is screwed onto the tie rods, for example, on the accessible rear side of the one panel formwork element. Securing the tie rods to the panel formwork elements is not the actual subject matter of the invention. Even though the invention per se, as set forth above, is intended for one-sided anchoring of double-sided formworks, other uses are not precluded.

The unexamined patent application, DE 102 45 187 A1, discloses a double-sided formwork comprising formwork shells that are disposed parallel to, and at a distance from, one another and comprise mutually aligned tie holes through which a threaded rod is placed, serving as the tie rod. The tie rod projects on both sides from rear sides of the formwork shells which face away from one another, and wing nuts are screwed onto the tie rod on the rear sides of the formwork shells which brace the formwork shells against pressure from flowable concrete poured between the formwork shells. A sleeve, which not only allows the tie rod to be recovered by pulling this out after casting is complete, but also holds the formwork shells at a distance from one another until the concrete is poured between the formwork shells, is disposed on the tie rod between the two formwork shells. Sealing elements, which provide sealing between the sleeve and the formwork shells, are disposed at end faces of the sleeve. So as to attach the sleeve and the sealing elements, the front side of at least one of the opposing formwork shells which faces the concrete must be accessible, and one-sided anchoring from the rear side of a formwork shell is not possible.

SUMMARY OF THE INVENTION

It is the object of the invention to propose a seal for a lead-through for a tie rod through a formwork shell of a concrete formwork, which can be attached from a rear side of the formwork shell which faces away from the concrete.

This object is achieved according to the invention described herein. The method according to the invention described herein provides that a tie rod is placed from a rear side, which is to say from a side facing away from the concrete, through a tie hole, intended for this purpose, in a formwork shell of a panel formwork element. Panel formwork elements typically include multiple tie holes for placing tie rods through, wherein the tie holes are usually arranged in a grid. Double-sided formworks are set up so that the tie holes in the opposing panel formwork elements are aligned with one another, whereby a tie rod can be placed through both formwork shells. The formwork shells of the opposing panel formwork elements are located on mutually facing front sides of the panel formwork elements. In the case of a double-sided formwork, a tie rod is placed from a rear side of a panel formwork element through the aligned tie holes of the formwork shells of two opposing panel formwork elements and, for example, is screwed into an internal thread so as to secure the tie rod to the opposing panel formwork element, which does not need to be accessible. For this purpose, the tie rod must include an internal thread in the region in which it is screwed into the internal thread. This does not preclude other options of securing the tie rod to the opposing panel formwork element; the manner in which the tie rod is secured to the panel formwork elements is not the actual subject matter of the invention. The tie rod can be secured on the accessible rear side of the one panel formwork element, for example, by screwing on a nut, for which purpose the tie rod also requires a thread in this region. Other manners of securing the tie rod to the panel formwork elements are possible, including threadless securing options. If the tie holes are located in the formwork shells next to struts of the frames, the tie rod is guided past the struts of the frames. If the tie holes in the formwork shells are covered by struts of the frames, the struts of the frames likewise include tie holes, which are aligned with the tie holes in the formwork shells, and the tie rod is placed from the rear side of the panel formwork element through the tie holes in the frame and in the formwork shell.

Prior to placement through the panel formwork element, a tubular or annular sealing element is disposed on the tie rod, which is longitudinally displaceable on the tie rod and, together with the tie rod, is optionally placed through the tie hole in the frame and through the tie hole in the formwork shell, so as to exit the tie hole in the formwork shell on the front side. The largest diameter of the sealing element is greater than a diameter of the tie hole in the formwork shell.

If the tie hole in the formwork shell does not have a circular cross-section, a corresponding lateral dimension is to be selected instead of the diameter of the tie hole and of the sealing element. When the sealing element passes through the tie hole in the formwork shell, the largest diameter of the sealing element is decreased due to, in particular, elastic deformation of the sealing element to the diameter of the tie hole in the formwork shell or, in any case, such that the sealing element is able to pass through the tie hole in the formwork shell. After having passed through the tie hole in the formwork shell, the sealing element elastically expands again to the original diameter thereof or, in any case, to a diameter that is greater than the diameter in the tie hole in the formwork shell. When the sealing element is made to bear against the front side of the formwork shell, this sealingly rests against the formwork shell and provides sealing at the tie hole. It is not excluded that the sealing element engages in the tie hole in the formwork shell when resting sealingly against the front side. The sealing element is passed through the tie hole in the formwork shell to such an extent that this exits, with the largest diameter thereof, from the tie hole in the formwork shell on the front side, and the sealing element elastically expands the largest diameter thereof to a diameter that is greater than the diameter of the tie hole in the formwork shell. The sealing element can comprise sections having diameters that are not greater than the tie hole. For example, the sealing element can comprise a tubular collar, which on the tie rod protrudes back into the tie hole in the formwork shell when the sealing element rests with the largest diameter thereof against the front side of the formwork shell. A hermetic seal is not necessary; it suffices that no concrete, or no more than a small amount of concrete, exits through the tie hole in the formwork shell.

Preferably, a sliding tube is disposed on the tie rod on a rear side of the sealing element, the sliding tube being moved together with the tie rod and moving the sealing element through the tie hole in the formwork shell when the tie rod is placed through the tie hole in the formwork shell. It is also conceivable to displace the sliding tube on the tie rod and thereby move the sealing element through the tie hole in the formwork shell. The use of a tool for passing the sealing element through the tie hole in the panel formwork element is also conceivable.

Instead of a sliding tube or a tool, for example an annular short element (such as a disk) is also conceivable, which is attached to the tie rod. The element can be mounted in a desired position on the tie rod fixedly or removably with a securing option. The short element has the advantage that more clearance is available for obliquely positioning the tie rod in the tie hole. The interaction between the short element, the sleeve and the sealing element predetermines the wall thickness.

The rear side of the sealing element faces the formwork shell when the sealing element has been moved through the tie hole in the formwork shell from the rear side to the front side of the formwork shell. The sliding tube, at least in a region that reaches the inside of the tie hole in the formwork shell, has a diameter that, at the most, is as large as, but not greater than, the diameter of the tie hole in the formwork shell. If the tie rod and the sealing element are also placed through tie holes in the frame of the panel formwork element, the diameter of the sliding tube in this region is also at the most as large as, but not greater than, a diameter of the tie holes in the frame of the panel formwork element.

In a preferred embodiment of the invention, the sliding tube is axially securable or detachably secured on the tie rod, so that placing the tie rod through the tie hole in the formwork shell causes the sliding tube axially secured on the tie rod to push the sealing element disposed on the tie rod through the tie hole in the formwork shell. In the case of a tie rod including a thread, the axial securing of the sliding tube on the tie rod can take place by way of an internal thread or a profile, which engages with the thread of the tie rod. Axial movement of the tie rod with respect to the sliding tube, for example for tensioning opposing panel formwork elements, can be carried out by way of a rotation of the tie rod, in which the sliding tube does not rotate therewith, and consequently does not move with respect to the panel formwork element. One embodiment of the invention provides for the sliding tube to be as long as a distance between a counter surface of the panel formwork element for abutment of the tie rod and a front side of the formwork shell of the panel formwork element. Added to this, if necessary, is a depth by which the sliding tube penetrates into the sealing element, when the sealing element is pushed through the tie hole in the formwork shell, and/or protrudes on the rear side of a panel formwork element when the panel formwork elements are tensioned with respect to one another. From this should be subtracted, if necessary, a depth by which the sealing element protrudes into the tie hole in the formwork shell when the sealing element rests sealingly against the formwork shell. The counter surface is formed, for example, by the rear side of the formwork shell or a rear side of the frame of the panel formwork element. The tie rod is supported with the abutment thereof, or in another manner, on the counter surface of the panel formwork element during tensioning. Since the sliding tube is as long as the distance between the counter surface of the panel formwork element for the abutment of the tie rod and the front side of the formwork shell, the sliding tube pushes the sealing element completely out of the tie hole on the front side of the formwork shell, as the tie rod is placed through the tie hole in the formwork shell of the panel formwork element, when the sliding tube is disposed at an, albeit small, distance from the abutment of the tie rod. This ensures elastic expansion of the sealing element on the front side of the formwork shell. If the tie rod is subsequently tensioned, the sealing element moves so as to bear sealingly against the front side of the formwork shell and moves the sliding tube back, so that the sliding tube does not protrude on the front side of the formwork shell and does not impair the sealing contact of the sealing element on the front side of the formwork shell.

In a further preferred embodiment of the invention, a sleeve is disposed on the tie rod on a front side of the sealing element, the sleeve being placed, together with the tie rod, through the tie hole in the formwork shell from the rear side of the formwork shell. The sealing element is placed through the tie hole in the formwork shell with the front side first. In a completely set-up double-sided formwork, the sleeve extends from the sealing element on the one formwork shell to a sealing element on the formwork shell of an opposing panel formwork element. The two sealing elements provide sealing between the sleeve and the formwork shells. The sleeve tube can be used as a spacer for the two opposing panel formwork elements of a double-sided formwork. Additionally, the sleeve allows the tie rod to be recovered, which can be pulled out of the concrete-cast sleeve after the concrete work has been completed and after striking. Striking refers to removal of the panel formwork elements, for example of a concrete-cast wall. In this way, the invention enables the use of a threaded rod having a thread extending across the entire length thereof, for example a so-called Dywidag bar, as a recoverable tie rod.

One embodiment of the invention provides an abutment on the tie rod for support on the rear side of the formwork shell or on the frame of the panel formwork element. For example, such an abutment can be a nut screwed onto the tie rod, a fixed abutment on the tie rod, or an abutment placed transversely on or through the tie. The list is by way of example and not exhaustive. So as to place the sealing element through the tie hole in the formwork shell, the sliding tube, on the rear side of the sealing element, is preferably located at a distance from the abutment so as to push the sealing element, when the tie rod is being placed through, until the abutment makes contact with the frame of the panel formwork elements or, on the rear side of the formwork shell, so as to push the sealing element through the tie hole in the formwork shell and at least a short distance further, so that at least a small distance is created between the sealing element and the front side of the formwork shell. This distance ensures the elastic expansion of the sealing element on the front side of the formwork shell. During tensioning of two opposing panel formwork elements of a double-sided formwork, the sealing element moves so as to bear sealingly against the front side of the formwork shell and pushes the sliding tube back into the tie hole in the formwork shell.

To ensure that, during the movement into the tie hole in the formwork shell, the sealing element constricts to the diameter of the same, one embodiment of the invention provides that the sealing element, in the direction of the rear side thereof, which for sealing purposes rests against the front side of the formwork shell, expands from a diameter that is not greater than the diameter of the tie hole in the formwork shell to a diameter that is greater than the diameter of the tie hole in the formwork shell. Preferably, the diameter of the sealing element expands continuously, and in particular conically, wherein a conical surface can also be hollow-round or convex. When the sealing element moves into the tie hole in the formwork shell, the tie hole in the formwork shell elastically compresses the sealing element at the expansion thereof to the diameter of the tie hole in the formwork shell. After passing through or exiting the tie hole in the formwork shell, the sealing element expands again at the largest diameter thereof to a diameter that is greater than the diameter of the tie hole in the formwork shell, so that the sealing element makes sealing contact on the front side of the formwork shell by way of return movement to the formwork shell. A wall thickness of the sealing element is no greater than half the difference in diameter between the tie hole in the formwork shell and the tie rod, so that, when passing through the tie hole in the formwork shell, the sealing element has room in an intermediate space surrounding the tie rod in the tie hole in the formwork shell.

BRIEF DESCRIPTION OF THE DRAWINGS

The invention will be described hereafter in greater detail based on one exemplary embodiment shown in the drawings. Embodiments of the invention that do not comprise all the features of the exemplary embodiment or of a claim are possible. In the drawings:

DETAILED DESCRIPTION OF THE INVENTION

Figure 1:
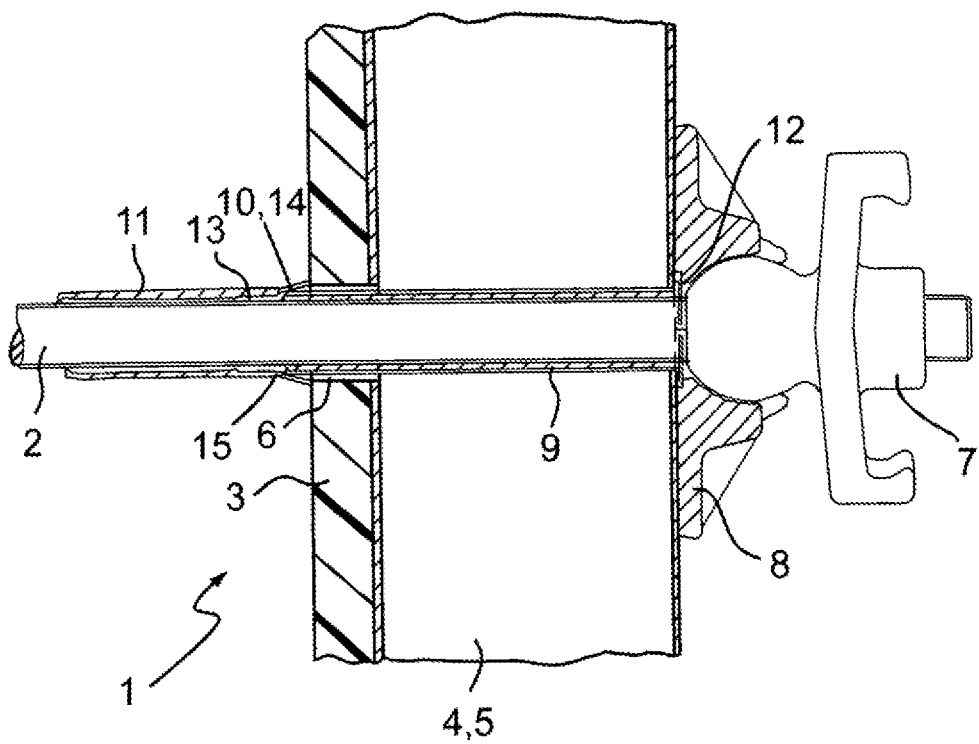
FIG. 1 shows a sectional view of a seal for a lead-through for a tie rod through a panel formwork element with a sealing element according to the invention.

FIG. 1 shows a panel formwork element 1 of a formwork for casting a wall from concrete in the region of a lead-through for a tie rod 2. The panel formwork element 1 comprises a board made of wood or plastic material, serving as a formwork shell 3, having a frame 4 attached to the side thereof, referred to as the rear side here, for reinforcement. The frame 4 is composed of mutually parallel and perpendicular struts 5 made of rectangular pipes made of aluminum or steel. Tie holes 6 for the passing through tie rods 2 are provided, extending through the frame 4 and the formwork shell 3. The tie holes 6 are distributed in a grid across the surface area of the formwork shell 4.

In the illustrated exemplary embodiment of the invention, the tie rod 2 is a threaded rod having a continuous thread, and more particularly a so-called Dywidag bar. It is not excluded that other threaded bars, conical tie rods or other rods can serve as the tie rod 2. A nut 7 is disposed on the tie rod 2 in an axially fixed manner by way of a plate-shaped abutment 8. The nut 7 can be screwed onto the tie rod 2; in the exemplary embodiment, this is screwed onto the tie rod 2 and pressed transversely to the tie rod 2, thereby being connected non-rotatably and thus rigidly, which is to say in an axially fixed and non-rotatable manner, to the tie rod 2. The Dywidag bar comprises two mutually parallel flat sides, which improve the non-rotatable connection of the nut 7 screwed onto the thread of the tie rod 2.

The panel formwork element 1 is part of a double-sided formwork, which is to say a further panel formwork element 1, which is not shown, is positioned at a distance opposite the panel formwork element 1, having tie holes that are aligned with the tie holes 6 of the one panel formwork element 1. The formwork shells 3 of the opposing panel formwork elements 1 face one another. Mutually facing surfaces of the formwork shells 3 that come in contact with the concrete when concrete is poured into an intermediate space between the opposing panel formwork elements 1 for casting the wall are referred to as front sides here. The opposing panel formwork elements 1 are held at a distance with respect to one another against pressure from unset concrete by tie rods 2, which are placed through the aligned tie holes 6 in the panel formwork elements 1. Unset concrete refers to the concrete poured, in the flowable state, between the panel formwork elements 1. The tie rods 2 are supported with the abutments 8 thereof on the rear sides of the formwork shells 3 or, as shown, on the rear sides of the frames 4 facing away from the formwork shells 3. The areas at which the abutments 8 of the tie rods 2 are supported on the panel formwork elements 1 are referred to here as counter surfaces of the panel formwork elements 1 for the abutments 8 of the tie rods 2.

The invention enables one-sided anchoring, which is to say the attachment of the tie rods 2 from the accessible rear side of a panel formwork element 1. The opposing panel formwork element 1 does not need to be accessible. According to the invention, the tie rods 2 are placed from the rear side of the one panel formwork element 1 through the tie holes 6 in the frame 4 and in the formwork shell 3 of the one panel formwork element 1 and placed into the aligned tie holes 6 in the opposing panel formwork element 1, which is not shown. In the exemplary embodiment, the opposing panel formwork element 1, which is not shown, includes internal threads into which the tie rods 2 are screwed by turning the nut 7 provided non-rotatably thereon.

Prior to placing the tie rod 2 through the tie holes 6 in the panel formwork element 1, a sliding tube 9 is screwed onto the tie rod 2, and thereafter a sealing element 10 and a sleeve 11 are pushed onto the tie rod 2. The sliding tube 9 comprises an internal thread, which engages with the thread of the tie rod 2 so as to be axially fixed on the tie rod 2. On a rear end facing the abutment 8, the sliding tube 9 comprises a collar 12, by way of which this is supported on the abutment 8.

In the illustrated exemplary embodiment, the sliding tube 9 is slightly longer than the panel formwork element 1, which is to say that the formwork shell 3 and the frame 4 together are of a thickness such that the sealing element 10, together with the sliding tube 9, can be pushed to such an extent through the panel formwork element 1 that the hollow truncated cone-shaped section 14 thereof exits the tie hole 6 on the front side of the formwork shell 3 and is able to spring back. It is also possible to use a shorter sliding tube 9, which, for example, is no longer than the diameter thereof (not shown), so that the tie rod 2 can be obliquely positioned when the tie holes 6 in opposing panel formwork elements 1 are not aligned. Behind a sliding tube 9 of such a length, a gap surrounding the tie rod 2 in the tie hole 6 allows the oblique positioning of the tie rod 2. So as to be able to push the sealing element 10, together with the tie rod 2, through the tie hole 6, such a short sliding tube 9 is preferably axially secured or securable on the tie rod 2 at least in a push-through direction. It is also possible for a ring or a disk, which, for example, is only one millimeter, or several millimeters, or a few millimeters thick or which, for example, is not thicker than the gap between the tie rod 2 and the tie hole 6, to be disposed on the tie rod 2 for pushing the sealing element 10 through the tie hole 6 (not shown). A ring or a disk is also preferably axially secured or securable on the tie rod 2 in the push-through direction.

Figure 2:
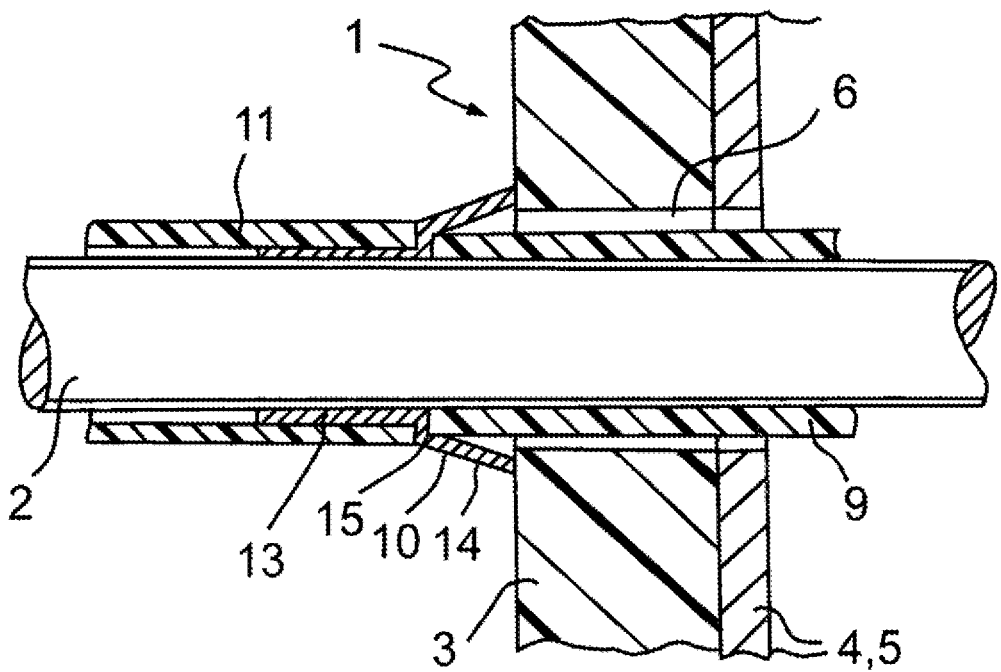
FIG. 2 shows an enlarged view in the region of the sealing element.

The sealing element 10 is composed of a compliant, elastically and/or plastically deformable component, for example an elastomer, and comprises a cylindrical tube-shaped section 13 and a hollow truncated cone-shaped section 14, which at the end thereof having the smaller diameter transitions in one piece into the hollow cylindrical tube-shaped section 13 by way of an annular step 15 (FIG. 2). Leading away from the hollow cylindrical tube-shaped section 13, the hollow truncated cone-shaped section 14 expands to the largest diameter of the sealing element 10, which is greater than the diameter of the tie hole 6 in the formwork shell 3 of the panel formwork element 1. At an end having the smaller diameter, a diameter of the hollow truncated cone-shaped section 14 of the sealing element 10 is not greater than the diameter of the tie hole 6 in the formwork shell 3. A diameter of the cylindrical tube-shaped section 13 of the sealing element 10 is smaller. The sealing element 10 is pushed onto the tie rod 2, with the hollow truncated cone-shaped section 14 facing the abutment 8. A wall thickness of the sealing element 10 is not greater than the difference in radius between the tie hole 6 in the formwork shell 3 and in the frame 5 of the panel formwork element 1 and the tied rod 2. In the exemplary embodiment, the wall thickness of the sealing element 10 is not greater than the difference in radius between the tie hole 6 and the sliding tube 9, so that the sealing element 10 pushed onto the tie rod 2 can be pushed, together with the sliding tube 9 that is axially fixed on the tie rod 2, through the tie hole 6 in the frame 4 and in the formwork shell 3 of the panel formwork element 1. During pushing through, the tie hole 6 in the frame 4 and in the formwork shell 3 elastically or plastically compresses the hollow truncated cone-shaped section 14 of the sealing element 10, which is made of an elastomer or compliant in another manner, so that the sealing element 10 can be pushed through the tie hole 6 in the frame 4 and in the formwork shell 3 of the panel formwork element 1. Prior to placing the tie rod 2 through the tie hole 6, the sliding tube 9 is moved away from the abutment 8 of the tie rod 2, by turning/screwing on the tie rod 2, to such an extent that this pushes the sealing element 10 completely through the formwork shell 3, and the hollow truncated cone-shaped section 14 exits the tie hole 6 on the front side of the formwork shell 3. Due to the elasticity thereof, the truncated cone-shaped section 14 of the sealing element 10 expands to a greater diameter than the diameter of the tie hole 6 in the formwork shell 3.

Thereafter, the opposing panel formwork elements 1 are jointly tensioned, which is to say brought to the intended distance thereof, by turning of the nut 7. The sleeve 11, the end of which is seated on the hollow cylindrical tube-shaped section 13 of the sealing element 10 and which pushes against the annular step 15 of the sealing element 10, moves the end face of the hollow truncated cone-shaped section 14 of the sealing element 10 having the greater diameter in sealing contact with the front side of the formwork shell 3 of the panel formwork element 1. The sealing element 10 provides sealing between the sleeve 11 and the formwork shell 3 of the panel formwork element 1, and thus of the lead-through for the tie rod 10 through the tie hole 6 in the panel formwork element 1.

A sealing element is likewise disposed on the tie rod 2 on the non-illustrated opposing panel formwork element 1 of the double-sided formwork, providing sealing between the sleeve 11 and the opposing panel formwork element. This sealing element can be designed identically to or differently from the shown sealing element 10. The sleeve 11 holds the opposing panel formwork elements 1 at the intended distance with respect to one another. Moreover, this allows the tie rod 2 to be recovered, by pulling this out of the sleeve 11, after the concrete has set and the panel formwork elements 1 have been removed, which is referred to as striking. Thus, the invention allows for a threaded bar having a continuous thread, serving as a recoverable tie rod 2 in the case of one-sided anchoring.

During the rotation of the tie rod 2, together with the nut 7 that us non-rotatable thereon, for tensioning of the opposing panel formwork elements 1, the sliding tube 9 does not rotate together therewith when the collar 12 thereof rests against the rear side of the frame 4 of the panel formwork element 1. As a result, the sliding tube 9 does not push the sealing element 10 away from the front side of the formwork shell 3 of the panel formwork element 1.

The invention claimed is:

1. A formwork system comprising:
    a formwork element including a formwork shell, wherein the formwork shell includes a tie hole through which a tie rod is guided, the diameter of the tie hole in the formwork shell being greater than a diameter of the tie rod;
    a tubular or annular sealing element for sealing a lead-through for the tie rod through the tie hole in the formwork shell of the formwork element for concrete formwork, the sealing element expanding on the outside, toward an end face, from a diameter of the sealing element that is not greater than a diameter of the tie hole in the formwork shell to a diameter of the sealing element that is greater than the diameter of the tie hole in the formwork shell, wherein the sealing element is radially resilient so as to be elastically constrictable to a diameter that is not greater than the diameter of the tie hole in the formwork shell when passing through the tie hole in the formwork shell, and a wall thickness of the sealing element is not greater than one half the difference in diameter between the tie hole in the formwork shell and the tie rod, wherein the sealing element surrounds the tie hole in the formwork shell and sealingly rests against a front side of the formwork shell; and a sleeve which is disposed on the tie rod on the front side of the formwork shell, the sealing element providing sealing between the sleeve and the formwork shell;

wherein the sealing element comprises a cylindrical tube-shaped section, which can be pushed onto the tie rod, the outside diameter of which is not greater than the diameter of the tie hole in the formwork shell, and a hollow truncated cone-shaped section, which expands on the outside, toward an end face of the sealing element, from a diameter that is not greater than the diameter of the tie hole in the formwork shell to a diameter that is greater than the diameter of the tie hole in the formwork shell.

2. The formwork system according to claim 1, further comprising a sliding tube, a ring or a disk disposed on the tie rod for pushing the sealing element on the tie rod through the tie hole in the formwork shell, having an inside diameter that is not smaller than a diameter of the tie rod and having an outside diameter that, in at least one area, is not greater than the diameter of the tie hole in the formwork shell.

3. The formwork system according to claim 2, wherein the sliding tube, the ring or the disk can be axially fixed on the tie rod.

4. The formwork system according to claim 1, wherein an outside diameter of the sleeve is not greater than the diameter of the tie hole in the formwork shell.

5. The formwork system according to claim 1, wherein the tie rod is a threaded rod having a continuous thread.

\* \* \* \* \*